United States Patent
He et al.

(10) Patent No.: US 6,178,159 B1
(45) Date of Patent: Jan. 23, 2001

(54) AVAILABLE BIT RATE FLOW CONTROL ALGORITHMS FOR ATM NETWORKS

(75) Inventors: Linhai He, Eatontown; Albert Kai-sun Wong, Edison, both of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/033,030

(22) Filed: Mar. 2, 1998

(51) Int. Cl.⁷ .................................................. G01R 31/08
(52) U.S. Cl. ........................ 370/234; 370/395; 370/468
(58) Field of Search ................................. 370/230, 231, 370/232, 233, 234, 236, 252, 253, 395, 396, 397, 412, 414, 416, 418, 468

(56) References Cited

U.S. PATENT DOCUMENTS

| | | | |
|---|---|---|---|
| 4,616,359 | * | 10/1986 | Fontenot ............................... 370/412 |
| 5,179,556 | * | 1/1993 | Turner ................................... 370/233 |
| 5,280,470 | * | 1/1994 | Buhrke et al. ......................... 370/232 |
| 5,457,687 | * | 10/1995 | Newman .............................. 370/85.3 |
| 5,535,201 | * | 7/1996 | Zheng ................................... 370/416 |
| 5,541,926 | * | 7/1996 | Saito et al. ............................ 370/412 |
| 5,577,035 | * | 11/1996 | Hayter et al. ......................... 370/412 |
| 5,583,861 | * | 12/1996 | Holden ................................. 370/412 |
| 5,675,576 | * | 10/1997 | Kalampoukas et al. ............. 370/232 |
| 5,694,554 | * | 12/1997 | Kawabata et al. .................... 370/397 |
| 5,737,313 | * | 4/1998 | Kolarov et al. ....................... 370/234 |
| 5,737,314 | * | 4/1998 | Hatono et al. ........................ 370/235 |
| 5,748,614 | * | 5/1998 | Wallmeier ............................ 370/412 |
| 5,754,530 | * | 5/1998 | Awdeh et al. ........................ 370/232 |
| 5,802,040 | * | 9/1998 | Park et al. ............................. 370/232 |
| 5,805,577 | * | 9/1998 | Jain et al. .............................. 370/234 |
| 5,805,599 | * | 9/1998 | Mishra et al. ........................ 370/468 |
| 5,812,527 | * | 9/1998 | Kline et al. ........................... 370/232 |
| 5,901,147 | * | 5/1999 | Joffe .................................... 370/412 |
| 5,933,425 | * | 8/1999 | Iwata ................................... 370/351 |
| 5,959,993 | * | 9/1999 | Varma et al. ......................... 370/397 |
| 6,069,872 | * | 5/2000 | Bonomi et al. ...................... 370/236 |
| 6,072,775 | * | 6/2000 | Ikeda ................................... 370/236 |

OTHER PUBLICATIONS

W. Melody Moh, Evaluation of ABR Congestion Control Protocols for ATM LAN and WAN, IEEE, pp. 193–196, 1996.*

Chen–Khong Tham & Wee–Seng Soh, Multi–sevice Connection Admission Control using Modular Neural Networks, IEEE, pp. 1022–1029, vol.3, 1998.*

Slobodan S. Petrovic, ABR Service in ATM Networks: Performance Comparison between Adaptive Stochastic and ERICA Flow Control Schemes with Guaranteed Minimum Cell Rate, IEEE, pp. 61–69, 1996.*

* cited by examiner

*Primary Examiner*—Melvin Marcelo
*Assistant Examiner*—Phuongchau Ba Nguyen

(57) ABSTRACT

Methods and apparatus for an ATM network for determining an allowed cell rate without the introduction of oscillations by using a average cell rate of all virtual circuits. Each ATM switch may be configured to calculate an allowed cell rate (ACR) for each connection between adjacent ATM switches along the virtual circuit and to relay this information back to a source using a BRM cell.

6 Claims, 1 Drawing Sheet

AVAILABLE BIT RATE FLOW CONTROL ALGORITHMS FOR ATM NETWORKS

FIELD OF THE INVENTION

The invention relates generally to asynchronous transfer mode (ATM) networks and, more particularly, to available-bit-rate (ABR) flow control algorithms.

BACKGROUND

The ABR service class has been defined by the ATM Forum as one of the five service classes in an ATM network. In an explicit-rate mode of ABR service in an ATM network, a real-time determination may be made as to the amount of bandwidth that each ABR circuit may utilize. The amount of bandwidth allocated to each ABR circuit is known as the Allowed Cell Rate (ACR). The ACR may be transmitted to the source of each circuit via special control cells known as resource management (RM) cells. The format of RM cells and the principles governing their generations and usage are specified by the ATM Forum Traffic Management 4.0 standard. There are two types of RM cells, Forward RM cells (FRM) which travel from the source to the destination, and Backward RM cells (BRM) which travel from the destination back to the source. Specifically, the Allowed Cell Rate is marked into the BRM cells because they are received by the source with a smaller delay than FRM cells. Also, according to the standard, the FRM cell contains a Current Cell Rate (CCR) field which is set by the source to indicate to the ATM network the cell rate at which the source is currently transmitting traffic. The intention of the CCR field is to assist the network in determining the ACR for all ABR circuits.

One key to a successful implementation of ABR service is the ATM network's capability to quickly and fairly adjust the allowed cell rate (ACR) for each ABR circuit when the level of congestion within the network changes. Accordingly, improved algorithms are desirable for varying the allowed cell rate (ACR) in ATM networks for each ABR circuit.

SUMMARY OF THE INVENTION

The present invention provides improved algorithms for varying the allowed cell rate (ACR) in ATM networks for each ABR circuit. Advantages of one or more aspects of the present invention include one or more of the following: 1) determining optimal ACR values which allow the sources to fully utilize the bandwidth of a trunk, 2) allowing convergence to an optimal ACR for each circuit quickly with minimal oscillation, 3) minimizing ACRs which are below the optimal values to prevent the ATM network bandwidth from being under-utilized, 4) minimizing ACRs which are above the optimal values to prevent buffer resources from being consumed and possible resulting loss of cells, 5) providing for weighted max-min fairness criteria as specified in the ATM Forum Traffic Management Document version 4.0 such that, for each trunk within the network, the ACR allocated to each circuit should be in proportion to the weight assigned to each circuit, and for a circuit traversing multiple trunks, the minimum ACR value allowed by all traversed trunks should be used as the ACR value for the circuit, 6) allowing for widely varying delays among different virtual circuits (VC) to accommodate a new allowed cell rate (ACR) values which arrive at the source with a varying delay after they are generated, 7) allowing for bottlenecked trunks where some VCs become bottlenecked at other trunks, and thus do not respond to an increase in ACR signaled by a particular trunk, and 8) the steady-state of the output queue length scales with the number of virtual circuits.

Aspects of the invention provide improved algorithms for use by the available-bit-rate (ABR) service in asynchronous-transfer-mode (ATM) networks to rapidly determine the optimal values of the Allowed Cell Rate (ACR) for individual Virtual Circuits (VC) using the ABR service.

In aspects of the present invention, each ATM switch along the path of an ABR virtual circuit (VC) calculates a weighted average of a measure of congestion at the particular ATM switch. The weighted average of the measure of congestion is then used to calculate an acceptable average rate at which the switch may operate. A weighted acceptable rate is then determined for each virtual circuit and compared with a measured and/or indicated cell rate for that virtual circuit. As an option, it may be desirable to keep track of the cell rate information of each of the virtual circuits to determine which virtual circuits are bottlenecked based on responsiveness of a measured cell rate to a newly requested cell rate. When the average cell rate is updated, the cell rates of bottlenecked connections are not included in the computation of a new average cell rate. In this manner, bottlenecked circuits will not reduce the responsiveness of the algorithm. In accordance with the above determinations, explicit rate and/or single-bit congestion indications are sent back to the traffic sources utilizing one or more resource-management (RM) cells. The feedback information contained in the resource-management cells may be utilized by each traffic source to regulate its traffic flow and thereby achieve high utilization of the network.

In another aspect of the invention, an algorithm is utilized which may perform one or more of the following functions in any combination and/or subcombination: 1) estimating the direction and extent of the desired change in the total flow rate based on both current queue length and sum of exponentially weighted past and present queue growth rates; 2) using a nonlinear mapping function to map estimated change in the total flow rate to the desired change in the average rate of all VCs; and/or 3) adapting to change of network conditions quickly.

Simulation studies show that algorithms in accordance with one or mores aspects of the invention exhibits one or more of the following properties: 1) robust performance in different network configurations, load conditions, and/or traffic types; 2) fast transient response yet very stable steady-state behaviors, thus maximizing the utilization of the network resource; 3) ensures the weighted max-min fairness among all VCs, even where there are VCs bottlenecked at some other switches; 4) low implementation complexity; 5) compatibility with other ABR flow control algorithms; and/or 6) compliance with existing ATM Forum traffic management standards.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
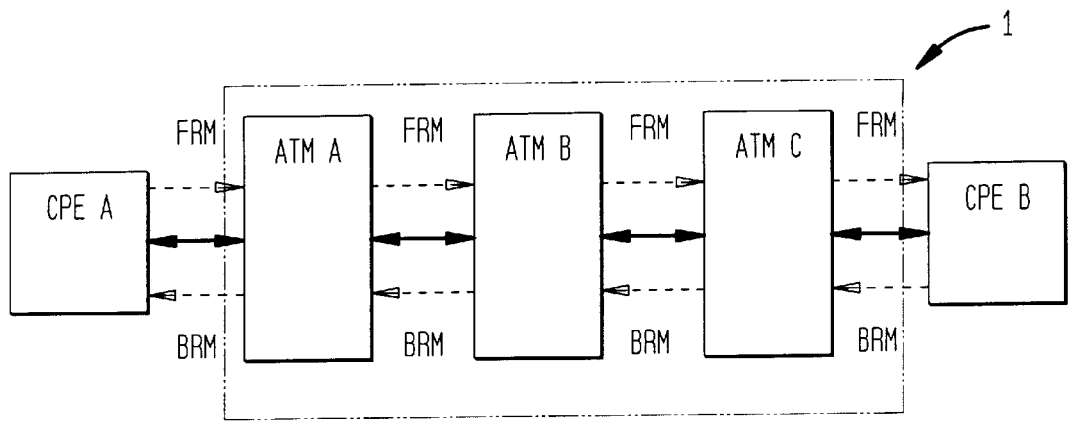
FIG. 1 illustrates an embodiment of an ATM network.

Referring to FIG. 1, an ATM network 1 may include, for example, a plurality of interconnected ATM switches ATM A, ATM B, and ATM C interconnecting one or more pieces of equipment located on the customer's premises (e.g., customer premises equipment A (CPE A) and customer premises equipment B (CPE B)). The ATM network 1 may be configured to carry data over a wide area such as an entire country and/or globally. The ATM network 1 may have a plurality of virtual circuits operating using any one of a plurality of service categories such as constant bit rate, real-time variable bit rate, non-real-time variable bit rate, available bit rate (ABR), and/or unspecified bit rate. The available bit rate category of service may be configured to adapt to a time-varying bandwidth availability in the ATM network 1. For example, where the CPE A in FIG. 1 can reduce or increase the rate at which data is output responsive to changes in bandwidth capacity of the ATM network 1, the available bit rate service class may be an appropriate service class for this particular CPE. The available bit rate class of service allows the bandwidth of the network to be maximized through the exploitation by available bit rate sources of changes and other fluctuations in traffic across the ATM network 1.

To guarantee fairness, each ABR virtal circuit may have a predefined peak cell rate and a minimum cell rate. In some embodiments, the minimum cell rate may be zero. Within this range, in an explicit-rate mode, a real-time determination may be made as to the amount of bandwidth (e.g., the allowed cell rate) that each ABR virtual circuit may utilize. This real-time determination may be made using a rate based flow control algorithm which communicates the new rates using one or more resource management cells. The ABR service category may be used for such applications as local area network (LAN) emulation across an ATM network.

Resource management allows network resources to be allocated in a manner which is consistent with service characteristics of various customer premises equipment such as CPE A and/or CPE B. One technique for allocating network resources in, for example, ATM network 1 is the use of one or more virtual connections between two network endpoints such as CPE A and CPE B. The use of virtual connections allow the separation of different traffic types requiring different service classes and/or different minimum/peak cell rates within a single service class. Resource management functions include service class and route selection, bandwidth allocation, and flow control. The need for improved resource management functions in the available bit rate (ABR) category of service is particularly acute because in this class of service the ATM network 1 typically must adapt its flow rate very quickly to fluctuations in traffic and other network conditions across the ATM network 1. In this manner, the ABR applications may make maximum use of the available bandwidth without impacting traffic on other service classes such as constant bit rate and variable bit rate service classes.

In order to achieve the above mentioned resource management, it is desirable to implement a robust flow control scheme such as rate-based flow control and/or credit-based flow control. In exemplary embodiments, rate-based flow control may be implemented using resource management cells to control the amount of bandwidth allocated to each ABR virtual circuit. In a forward direction (e.g., CPE A to CPE B), forward resource management cells (FRM) may be utilized to communicate information from the source to the destination as shown in FIG. 1. Similarly, in a backward direction, backward resource management (BRM) cells may be utilized to communicate information from the destination (e.g., CPE B) back to the source (e.g., CPE A). Using rate-based flow control, the ATM network 1 may instruct the source to slow down its transmission when the network starts to experience congestion.

In exemplary embodiments, the CPE A sends a forward resource management (FRM) cell at regular intervals (e.g., after a certain number of cells such as 64 or more cells). The FRM cell may be variously configured to contain a current cell rate (CCR) at which the source is transmitting. It may also include a field for an explicit cell rate (ER) which is the maximum rate that a switch on the virtual circuit (e.g., either ATM A, ATM B, and/or ATM C) will allow the source to transmit. An explicit forward congestion indication (EFCI) bit may be set in a FRM cell traveling in the forward direction (e.g., CPE A to CPE B) to indicate that the network is experiencing congestion and to initiate flow control. When the FRM cell reaches the destination (e.g., CPE B), it may be turned around by the destination and sent back as a backward resource management (BRM) cell. Where the explicit forward congestion indication bit is set, the destination may include set a congestion indication bit (CI bit) in the BRM cell to inform the source that congestion is present in the ATM network 1. The setting of the congestion indication bit (CI bit) is used in relative rate marking flow rate based flow control algorithms to tell the source to slow down and decrease the allowed cell rate (ACR) using a predefined algorithm.

One key to a successful implementation of ABR service is an ability of the ATM network 1 to quickly and fairly adjust the allowed cell rate (ACR) for each ABR circuit when the level of congestion within the network changes. Accordingly, improved algorithms are desirable for varying the allowed cell rate (ACR) in ATM networks for each ABR circuit.

Improved ACR Determination Algorithm

In exemplary embodiments of the present invention, each switch may be configured to calculate an allowed cell rate (ACR) for each connection between adjacent ATM switches along the virtual circuit. Conventional algorithms tend to have large oscillations due to propagation delays. For example, where there is a lot of traffic, one of the switches in the ATM network may need to tell the source (e.g., CPE A) to slow down. However, because of delays in communicating this information to the source, the source cannot respond immediately and hence there is a certain amount of overshoot and/or undershoot in determining the new allowed cell rate. Further, some connections are bottlenecked (e.g., have cells backed up in a queue) upstream and hence do not receive a particular BRM cell having new flow control commands for an indeterminate period of time. Under these conditions, the over/under shoot problem in the flow control is exasperated. Thus, there is a need for improved algorithms which respond quickly, treat each virtual connection fairly, and reduce oscillations.

In one exemplary embodiment, the ATM switches ATM A, ATM B, and/or ATM C along the path of the virtual circuit (VC) may be configured to include an output queue which includes a separate priority queue for handling data associated with the ABR service class. Further, in this embodiment, each source (e.g., CPE A) in the ATM network 1 may be configured to operate in the explicit cell rate (ER) mode and/or in a binary mode and employ other standard ATM traffic management protocols.

In exemplary embodiments, the allowed cell rate (ACR) may be determined using the principles of a proportional derivative algorithm described in the text "Linear System Theory and Design" by C. T. Chen, published by Saunders College Publishing, Harcourt BraceCollege Publishers, 1984. The proportional derivative (PD) algorithm may be variously adapted. In one embodiment, the PD algorithm examines the total number of cells disposed in the output buffer queue for all virtual circuits operating in ABR mode for a single ATM switch.

Figure 2:
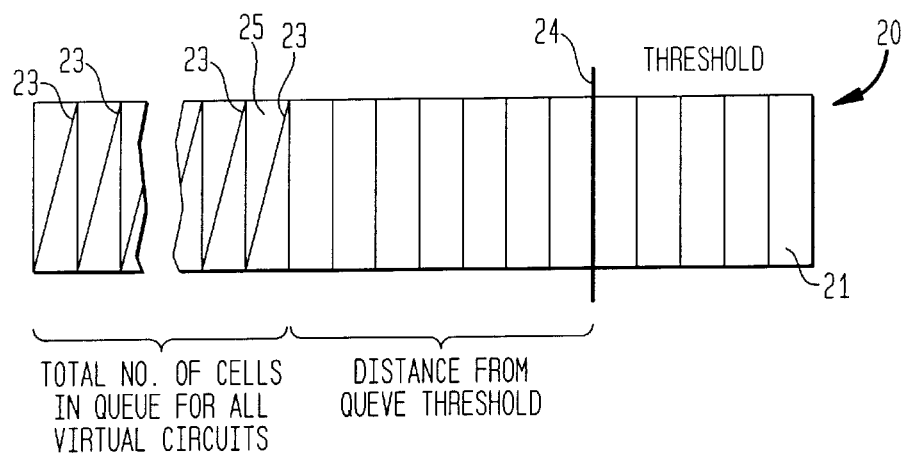
FIG. 2 is a block diagram illustrating an embodiment of an output queue of an ATM switch.

As shown in FIG. 2, the output queue 20 may comprise a plurality of storage locations for storing individual cell storage locations 21. One or more of the individual cell storage locations 21 may include cells of data 23 waiting to be output from the output queue 20. As the total number of cells increases, it may approach a threshold 24. The distance from the last full cell storage location 21 to the threshold 24 is one measure of the need to make adjustments in the allowed cell rate (ACR). Other measures of the need to make adjustments in the allowed cell rate (ACR) may include the total number of cells in the queue for all virtual circuits, the growth rate of the total number of cells in the queue, and/or the rate of change of the distance of the last cell in the queue 25 to the threshold 24.

In other embodiments of the present invention, the allowed cell rate (ACR) may be modified based on the total number of cells in the queue, the rate of change of the total number of cells in the queue, the distance of the last cell in the queue from the threshold, and/or the rate of change of the distance of the last cell in the queue to the threshold. For example, a desired total number of cells and/or distance from the queue threshold may be determined. The ACR may thereafter be adjusted based on a combination of factors including a desired rate of change of cells in the queue given the current total number of cells in the queue, a desired rate change of the distance from the threshold based on the current distance of the last cell in the queue from the threshold, and/or the rate of change of the distance of the last cell in the queue to the threshold.

The reference point utilized may be what the source indicated was the current cell rate (CCR) in a previous FRM message and/or what the previous allowed cell rate (ACR) was determined to be set. In order to minimize oscillations, it may be desirable to utilize as a reference point to make adjustments what the source has declared to be the current cell rate (CCR). However, where there is a possibility that the source is unreliable, it may be desirable to use a measured current cell rate to established a reference point. The use of a measured current cell rate is highly desirable where the source is unreliable. In this manner, the ATM network 1 retains control over all rate-based flow control parameters.

Once the current cell rate (CCR) for each virtual circuit ($CCR_i(n)$) is known, it may be desirable to calculate a mean cell rate which may be a weighted average of all cell rates for all virtual circuits utilized within one of the ATM switches. In one exemplary embodiment, the mean cell rate (MeanRate) may be calculated to be the exponential average of the current cell rates divided by the weights for all of the connections. This may be calculated as, for example, indicated in equation 3 in the example below.

A description of one exemplary algorithm which embodies aspects of the present invention is described below:

1. Each ATM switch monitors/samples the queue length of its ABR queue Q(n) every T second and then updates variable PastGrowthRate by the following rule:

if (PastGrowthRate==0)

PastGrowthRate=$Q(n)-Q(n-1)$;

else

PastGrowthRate=$(Q(n)-Q(n-1))+F_d$*PastGrowthRate; (1)

where $F_d$ is a constant less than but close to unity.

2. Within each control interval, if the switch receives an FRM cell, which carries the current cell rate (CCR) of a VC, it may update the variable MeanRate by the following rule (alternatively, as discussed above, the ATM switch may determine current cell rate (CCR) from counting the cell arrivals rather than trusting the CCR announced by the source in the FRM cell):

if ($CCR_i(n)/w_i$>MeanRate*$F_n$) (2)

if (MeanRate==0)

MeanRate=$CCR_i(n)$;

else

MeanRate=$(1-AVF)$*MeanRate+$AVF$*$CCR_i(n)/w_i$; (3)

else

MeanRate is unchanged.

Where AVF is an averaging factor having a typical value of 1/16 (e.g., an exponential smoothing factor), $w_i$ is the weight of Vci, $F_n$ is a small constant whose typical value is about 0.1, however, in a particular system, this value may be tuned to an optimum value. CCR is a value declared by the source and/or a measured value as discussed above. Where the value of AVF is about 0.06, the old mean rate is weighted much heavier than the new mean weight.

3. The AIM switch may be configured to next compute a variable RateChange in accordance with the following:

RateChange=$-k_1$*$[Q(n)-Q_T]-k_2$* PastGrowthRate (4)

where $k_1$ and $k_2$ are control constants and $Q_T$ is the desired queue level at steady-state. The control constants may be used to emphasize and/or deemphasize the distance from the threshold versus smoothed past growth rate. It will be apparent to those skilled in the art that $[Q(n)-Q_T]$ is the distance from the threshold and that Q(n) is the total queue length of all virtual circuits and $Q_T$ is the queue threshold. Thus, when the queue is above the threshold, it is desirable to have a negative rate change. When the queue is below the threshold, it is desirable to have a positive rate change. When the past growth rate is positive, it may be desirable to slow down and when the past growth rate is negative, it may be desirable to speed up.

4. The ATM switch may be configured to next estimate the fair rate for Vci in the following way:

FairMultiplier=MeanRate*$[1+f_m(RateChange)]$ (5)

Figure 3:
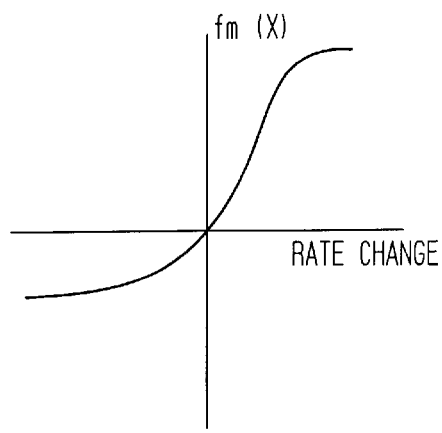
FIG. 3 illustrates an embodiment of a mapping function.

FairRate$_i$=FairMultiplier*$w_i$ (6)

where $f_m(x)$ is a nonlinear mapping function of the shape shown in FIG. 3 (e.g. y=A*tanh(B*x)). The non-linear mapping function may be implemented in a ROM lookup table. The particular shape off $f_m(x)$ may be chosen to discourage large rate changes. Thus, the fair rate for virtual circuit i is equal to the FairMultiplier times the weight of the virtual connection i.

5. The ATM switch may be configured next to locate a backwards resource management (BRM) cell for a particular virtual circuit and set the explicit rate (ER) as the following:

$ACR_i(n+1)$=max ($MCR_i$, min ($CCR_i(n)+\mu$*[FairRate$_i$-$CCR_i(n)$], $PCR_i$)) (7)

where $\mu$ is a small constant used as a damping factor (e.g., 0.5), and $MCR_i$ & $PCR_i$ are the minimum and peak cell rate of Vci, respectively, [FairRate$_i$-$CCR_i(n)$] define the distance between a fair rate and the current rate.

Once a mean cell rate is known, it may be desirable to calculate the amount by which the weighted cell rate (e.g., $CCR_i(n)/w_i$) for each ABR virtual circuit varies from the mean cell rate.

As reflected in equation (4), the target rate change may be a function of a) the queue length in relation to a target threshold $Q_T$, and b) the detected growth rate of the queue. Part a) is significant because it ensures that, in a steady state, the buffer occupancy is around a non-zero threshold, thus keeping the output port of the ATM switch busy. An algorithm that does not attempt to adjust the steady-state buffer content to a non-zero threshold may suffer from loss of throughput.

Similar to an earlier patent application (Dynamic ATM Network Access Control Using an Availability Parameter At Each Port In A Network Path, Albert K. Wong, U.S. patent application Ser. No. 08/299,472, filed Aug. 31, 1994), hereby incorporated by reference, the algorithm may be configured to estimate a rate multiplier parameter for each port (e.g., the FairMultiplier in equation (5)), which is generally similar to the Availability Parameter A in the earlier patent application). One distinction is that the Fair-Multiplier is estimated based on the intended rate change (RateChange) derived, for example, in equation (4), and an estimate of the average value of the rate multipliers that the active VCs are actually using at the time (e.g., based on equation (3)), which represents an exponential averaging method). In contrast, in the earlier patent application the new multiplier value is generated based on the old multiplier value and the desired direction of change. The new approach provides a clear advantage in the stability of the algorithm. Specifically, in the earlier approach, when the trunk increases its rate multiplier value in an attempt to increase its bandwidth utilization, it may happen that the VCs do not necessarily respond with a higher input rate as they may not need the higher rate or may be bottle-necked by other trunks. As a result, the trunk may increase the rate multiplier still some more in an attempt to increase its bandwidth utilization. In this new approach, the rate multiplier does not feed on itself, hence oscillations are reduced, instabilities are prevented, and efficiencies are increased.

Further, where a damping function and/or non-linear mapping function $f(m)$ is applied to the intended rate change (e.g., equation (5)) to prevent large changes in the rate multiplier, the overall system efficiency is improved.

In equation (2), VCs with an actual current cell rate that may be too small will not enter into the estimate of the mean rate. This may be advantageous since it may prevent VCs that are bottlenecked at other trunks from lowering the estimate the actual operative rate multiplier. In other words, it may be desirable to estimate and change the rate multiplier being used by VCs that would respond to the changes of this multiplier, not those that are bottlenecked somewhere else and would thus cannot not respond to a change in the rate multiplier.

As described in equation (1), the growth rate of the queue may be estimated based on the current growth rate and the past growth rate. This smoothing of the estimate prevents the algorithm from being overly oscillatory. Further, the target rate of a VC (FairRate)$_i$ may be the rate multiplier times the individual weight of the VC (equation (6)). The Allowed Cell Rate (ACR) for the VC may be adjusted towards the target rate according to equation (7). This ACR value may then be sent back to the source of VC via the Explicit Rate (ER) field of the BRM cell. As described in U.S. patent application Ser. No. 08/299,472 incorporated by reference above, each trunk may compare the value of the ER field in a BRM cell it receives with the ACR value that it generates via its internal algorithm. This may help ensure that the minimum of the two values is stored in the ER field of the BRM cell before the BRM cell is sent further upstream. In other words, the VC source will receive in a BRM cell the smallest of the ACR values determined by each trunk along the path traversed by the VC.

In one exemplary embodiment, an average rate for all virtual circuits is determined as described above. Factors described above associated with the queue are examined to determine if a change is required. If a change is required, the amount of change is input into a smoothing function as, for example, shown in FIG. 3. If there is a small amount of total rate change, then the rate change actually implemented is proportional to the desired amount of rate change. However, where there is a large amount of rate change indicated, then the amount of rate change only changes by a fixed amount regardless of the magnitude of the indicated rated change. The fixed amount may be at the point where $fm(x)$ becomes parallel to the X axis in FIG. 2.

While exemplary systems and methods embodying the present invention are shown by way of example, it will be understood, of course, that the invention is not limited to these embodiments. Modifications may be made by those skilled in the art, particularly in light of the foregoing teachings. For example, it will be well known in the art that a processor in each of the ATM switches in FIG. 1 implements the algorithms discussed herein. Further, each of the steps of the aforementioned embodiments may be utilized alone or in combination with steps of the other embodiments.

We claim:

1. A method for controlling end-to-end transmission rate of a virtual circuit across a network comprising the steps of:

averaging a plurality of weighted rates respectively of a plurality of virtual circuits; and determining an available cell rate value according to a proportional derivative control algorithm, measured current cell rates of each virtual circuit, and the average of the plurality of weighted rates.

2. A method of determining an available cell rate of a virtual circuit across a network comprising determining a fair rate multiplier based on an intended rate change and an estimate of an average value of a plurality of weighted rates being respectively utilized by a plurality of active virtual circuits.

3. The method of claim 2 including applying a non-linear mapping function to the intended rate change to generate an intended change in the average value.

4. A method for determining an available cell rate value of a virtual circuit across a network using a proportional derivative control algorithm and measured current cell rates of each virtual circuit, the method including:

generating a reference point for controlling a cell rate on a particular virtual circuit based on an average value of a plurality of weighted rates respectively for a plurality of virtual circuits; and determining an intended rate change based on a distance of a number of cells in a queue from a threshold and an exponentially weighted growth rate of a number of cells in the queue.

5. A method for determining an available cell rate of a virtual circuit across a network comprising determining a fair rate multiplier based on an intended rate change and an estimate of an average value of a plurality of weighted rates being respectively utilized by a plurality of active virtual circuits, wherein determining a fair rate multiplier includes determining an exponentially weighted growth rate of a number of cells in the queue.

6. An ATM network comprising a plurality of ATM switches, each ATM switch determining an available cell rate value of a virtual circuit across the network based on a proportional derivative control algorithm and a measured current cell rate, each ATM switch controlling an average cell rate based on an average value of a plurality of rate multipliers for each of a plurality of virtual circuits being handled by the respective ATM switch, and each ATM switch having a queue and determining an intended rate change based on a distance of a number of cells in the queue from a predetermined threshold and an exponentially weighted growth rate of a number of cells in the queue, each ATM switch controlling an average cell rate on a particular virtual circuit in conjunction with the average value.

* * * * *